US006271455B1

(12) United States Patent
Ishigaki et al.

(10) Patent No.: US 6,271,455 B1
(45) Date of Patent: Aug. 7, 2001

(54) MUSIC PIECE DISTRIBUTING APPARATUS, MUSIC PIECE RECEIVING APPARATUS, MUSIC PIECE DISTRIBUTING METHOD, MUSIC PIECE RECEIVING METHOD, AND MUSIC PIECE DISTRIBUTING SYSTEM

(75) Inventors: Masanori Ishigaki, Kanagawa; Teruyuki Shitara, Tokyo, both of (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/269,459

(22) PCT Filed: Jul. 28, 1998

(86) PCT No.: PCT/JP98/03349

§ 371 Date: Mar. 26, 1999

§ 102(e) Date: Mar. 26, 1999

(87) PCT Pub. No.: WO99/06991

PCT Pub. Date: Feb. 11, 1999

(30) Foreign Application Priority Data

Jul. 29, 1997 (JP) ............................................ P09-202867

(51) Int. Cl.[7] ...................................................... G01H 7/00

(52) U.S. Cl. ........................ 84/605; 434/307 A; 704/500

(58) Field of Search .................................. 700/500–504; 434/307 A; 84/605

(56) References Cited

U.S. PATENT DOCUMENTS 5,464,946 11/1995 Lewis .................................... 84/609
5,569,869 10/1996 Sone ...................................... 84/609
5,675,575 * 10/1997 Wall, Jr. et al. .
5,974,387 * 10/1999 Kageyama et al. .................. 704/500
6,002,694 * 12/1999 Yohsizawa et al. .
6,021,136 * 2/2000 Bharucha et al. ............... 704/501 X
6,122,338 * 9/2000 Yamauchi ........................ 704/500 X

FOREIGN PATENT DOCUMENTS 5-114959 5/1993 (JP) .
5-347636 12/1993 (JP) .
8-076775 3/1996 (JP) .
8-084382 3/1996 (JP) .
8-149091 6/1996 (JP) .
8-221084 8/1996 (JP) .
8-305380 11/1996 (JP) .
9-023339 1/1997 (JP) .
9-075865 3/1997 (JP) .
9-127966 5/1997 (JP) .
9-149399 6/1997 (JP) .
9-160572 6/1997 (JP) .
9-160772 6/1997 (JP) .
9-204327 8/1997 (JP) .
10-276192 10/1998 (JP) .

* cited by examiner

*Primary Examiner*—Jeffrey Donels
(74) *Attorney, Agent, or Firm*—Lerner, David, Littenberg, Krumholz & Mentlik, LLP

(57) ABSTRACT

A music piece distributing apparatus receives a request signal including music piece identification information and compressing system identification information from a receiving apparatus and transmits music piece data in which a music piece corresponding to the music piece identification information has been compressed by a compressing system corresponding to the compressing system identification information to the receiving apparatus. The request signal is transmitted through a public line. A music piece receiving apparatus receives the music piece data from the music piece distributing apparatus by a digital broadcasting receiving apparatus and decodes the received music piece data by a compression decoding system corresponding to the compressing system designated by the compressing system identification information.

19 Claims, 12 Drawing Sheets

MUSIC PIECE DISTRIBUTING APPARATUS, MUSIC PIECE RECEIVING APPARATUS, MUSIC PIECE DISTRIBUTING METHOD, MUSIC PIECE RECEIVING METHOD, AND MUSIC PIECE DISTRIBUTING SYSTEM

TECHNICAL FIELD

The invention relates to a music piece distributing apparatus, a music piece receiving apparatus, a music piece distributing method, a music piece receiving method, and a music piece receiving system which can easily distribute requested music piece data through digital broadcasting.

BACKGROUND OF THE INVENTION

A communication type KARAOKE system is known as a conventional music piece distributing system. The communication type KARAOKE system has the following problems because MIDI (Musical Instrument Digital Interface) data is used.

In most cases of making MIDI data, a person who has a special skill has to listen to music and make a musical score. When MIDI data is made, special skill and knowledge are also needed and it is difficult to accurately trace the original music piece.

For reproduction by an MIDI sound source, it is difficult to equalize the tone of a musical instrument, the brace of a wind instrument, the touch of a keyboard instrument, or the playing manner or cutting of a stringed instrument with those of the original music piece. It is difficult to form the same mood as that of the original music piece while including an upsurging manner of a melody or the like.

When data is distributed by audio compression there are problems because a plurality of audio compressing techniques exist with individual characteristics, and independent formats. There is no compatibility.

It is, therefore, an object of the invention to provide a system which selects and distributes music piece data using a compression method that can be reproduced (that is, can be decoded) by a receiving apparatus.

SUMMARY OF INVENTION

According to the invention, there also is provided a music piece distributing apparatus for distributing music piece data on the basis of a request from a remote receiver, characterized by comprising:

receiving means for receiving a request signal from the receiver including at least music piece identification information and compressing system identification information; and transmitting means for transmitting music piece data in which a music piece corresponding to the music piece identification information included in the received request signal has been compressed by a compressing system corresponding to the compressing system identification information included in the request signal.

According to the invention, there also is provided a music piece receiving apparatus for requesting music piece data of a music piece selected by the user to a remote music piece distributing apparatus and receiving and outputting the music piece data distributed from the music piece distributing apparatus, characterized by comprising:

forming means for forming a request signal including at least music piece identification information to identify the selected music piece and compressing system identification information to identify a compressing system when the music piece is distributed;

transmitting means for transmitting the formed request signal to the music piece distributing apparatus;

receiving means for receiving the music piece data distributed from the music piece distributing apparatus; and decoding means for decoding the received music piece data by a compression decoding system corresponding to the compressing system designated by the compressing system identification information.

According to the invention, there is further provided a music piece distributing method of distributing music piece data on the basis of a request from a remote receiver, comprising the steps of:

receiving a request signal from the receiver including at least music piece identification information and compressing system identification information; and transmitting music piece data in which a music piece corresponding to the music piece identification information included in the received request signal has been compressed by a compressing system corresponding to the compressing system identification information included in the request signal.

According to the invention, there is further provided a music piece receiving method of requesting music piece data of a music piece selected by the user to a remote music piece distributing apparatus and receiving and outputting the music piece data distributed from the music piece distributing apparatus, comprising the steps of:

forming a request signal including at least music piece identification information to identify the selected music piece and compressing system identification information to identify a compressing system when the music piece is distributed;

transmitting the formed request signal to the music piece distributing apparatus;

receiving the music piece data distributed from the music piece distributing apparatus; and decoding the received music piece data by a compression decoding system corresponding to the compressing system designated by the compressing system identification information.

According to the invention, there is further provided a music piece distributing system in which a music piece distributing apparatus distributes music piece data on the basis of a request from a remote receiver, wherein in the receiver, a request signal including at least music piece identification information to identify the selected music piece and compressing system identification information to identify a compressing system when the music piece is distributed is formed and the formed request signal is transmitted to the music piece distributing apparatus, and in the music piece distributing apparatus, the transmitted request signal is received from the receiver, and the music piece data in which the music piece corresponding to the music piece identification information included in the received request signal has been compressed by the compressing system corresponding to the compressing system identification information included in the request signal is transmitted.

BRIEF DESCRIPTION OF THE DRAWINGS

FIG. 7 is a flowchart showing an example of the processes of the invention on the broadcasting station side to which;

DETAILED DESCRIPTION OF THE PREFERRED EMBODIMENTS

Figure 1:
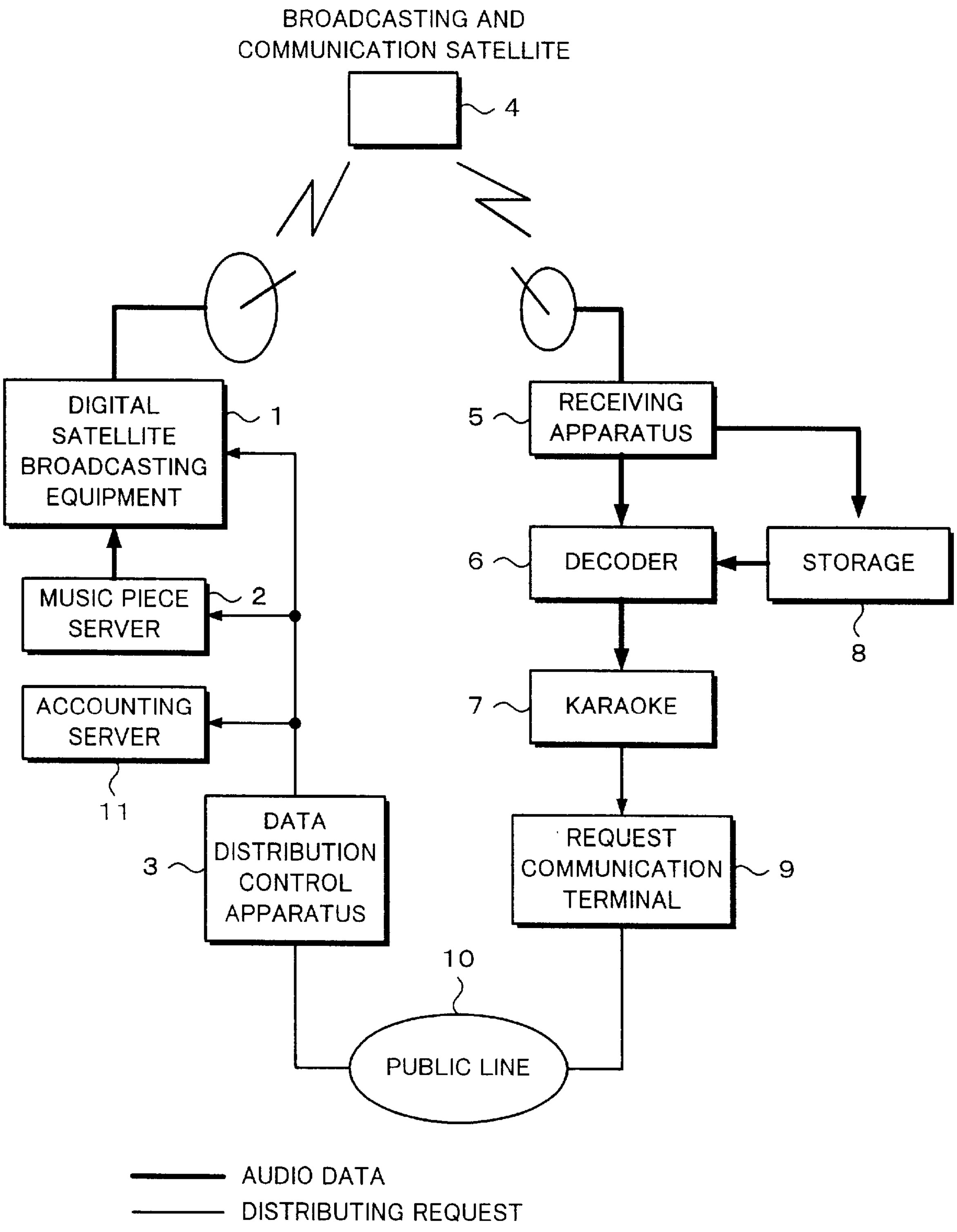
FIG. 1 is a block diagram of a system in accordance with the invention is applied.

An embodiment of the invention will now be described hereinbelow with reference to the drawings.

To make the invention easy, an outline of the invention will be first explained. The invention relates to a system in which when KARAOKE songs are sung in a KARAOKE box or the like, compressed music piece data is decompressed and reproduced, thereby enabling the KARAOKE songs to be sung in a mood near to the original music pieces. As main component elements of the system, there are a digital broadcasting equipment and a music piece server in order to distribute the music piece data by an arbitrarily designated compressing system. To receive the distributed data, the KARAOKE box or the like needs a digital broadcasting receiving apparatus together with a KARAOKE apparatus. Further, a communication terminal using a public line to make a distributing request when a music piece which the user tries to sing by KARAOKE is not previously stored is provided. A control unit of distribution data by a request from the communication terminal is provided on the broadcasting station side.

Technical requirements will now be described prior to describing an embodiment of the invention. First, with respect to a digital broadcasting technique by the ground wave or a communicating and broadcasting satellite, as digital satellite broadcasting techniques which have been put into practical use, there is a technique using (1) the MPEG (Moving Picture Experts Group) systems and a technique using (2) the DVB (Digital Video Broadcasting). As another technique, there is also a ground wave digital broadcasting technique such as a GA(Grand Alliance) of the U.S.A. or the like. It should be noted here that the invention not only relates to digital broadcasting but also has a function of a conditional access which can selectively identify the user who can received data. A system in accordance with the invention is realized on the assumption that the technique will be put into practical use among the service providers of the digital satellite broadcastings.

As techniques for compressing music pieces, an MPEG audio, an ATRAC (Adaptive TRansform Acoustic Coding), a PCM (Pulse Code Modulation) system, and the like are considered. In the present system, it is assumed that a plurality of compressed data including the MPEG audio and conventional MIDI data are stored into a server of a large scale. As a method other than the above method, a method of equipping a real-time encoding system based on various compressing systems and compressing the data from the original data of music pieces at the time of distribution is also considered. However, if the data has previously been compressed, the data can be soon extracted and this method also contributes to the saving of memory capacity of the server.

A controller for controlling transmitting equipment of a digital broadcasting and a large scale (capacity) server, receiving a request from the user, and distributing compression data of a desired music piece is necessary. A public line such as a telephone line or the like is presumed as communicating means for receiving the request from the user and it is assumed that the apparatus has a function for automatically accepting the request from the user by a predetermined signal or command. Such a construction can be realized by a computer such as a PC or workstation having a modem.

It is assumed that the KARAOKE apparatus which is used by the user for KARAOKE has an ordinary mechanism and function. As other devices, a receiver of a digital broadcasting and a decoder for decompressing the compressed music piece data are needed. The decoder has a storage and, in the case where the music piece selected by the user has been stored in the storage, it is reproduced, and in the case where it is not stored in the storage, a computer which exists in a broadcasting station and controls a distributing request is accessed by using a telephone line and a compressing system and music piece data are requested.

FIG. 1 shows a block diagram of an example of an embodiment of the invention. Each unit will now be described hereinbelow. It is assumed that a mechanism of transmission of a digital satellite broadcasting equipment 1 has been constructed by the technique standardized by the MPEG systems or DVB. A music piece server 2 compresses music pieces for KARAOKE by various audio compressing techniques and stores them as a database. An accounting server 11 is used to account each time the music piece data is distributed in response to a request from the receiver. The above component elements are controlled by a data distribution control apparatus 3 which receives a data distributing request from the user through a public line 10 and functions.

The distribution data which was up-linked by the digital satellite broadcasting equipment 1 is returned by a communication and broadcasting satellite 4 and is received by a receiving apparatus 5 installed in the KARAOKE box or the like. The received distribution data is decompressed by a decoder 6 and is reproduced as a music piece by a KARAOKE apparatus 7. The distributed music piece data is recorded as it is to a storage device 8 like a hard disk. After that, when the user selects a music piece, the music piece is decompressed by the decoder 6 on the basis of the data recorded in the storage device 8 and is reproduced by the KARAOKE apparatus 7. When the music piece selected by the user is not recorded in the storage device 8, a request is sent to the data distribution control apparatus 3 installed in the broadcasting station by a request communication terminal 9 via the public line.

Figure 2:
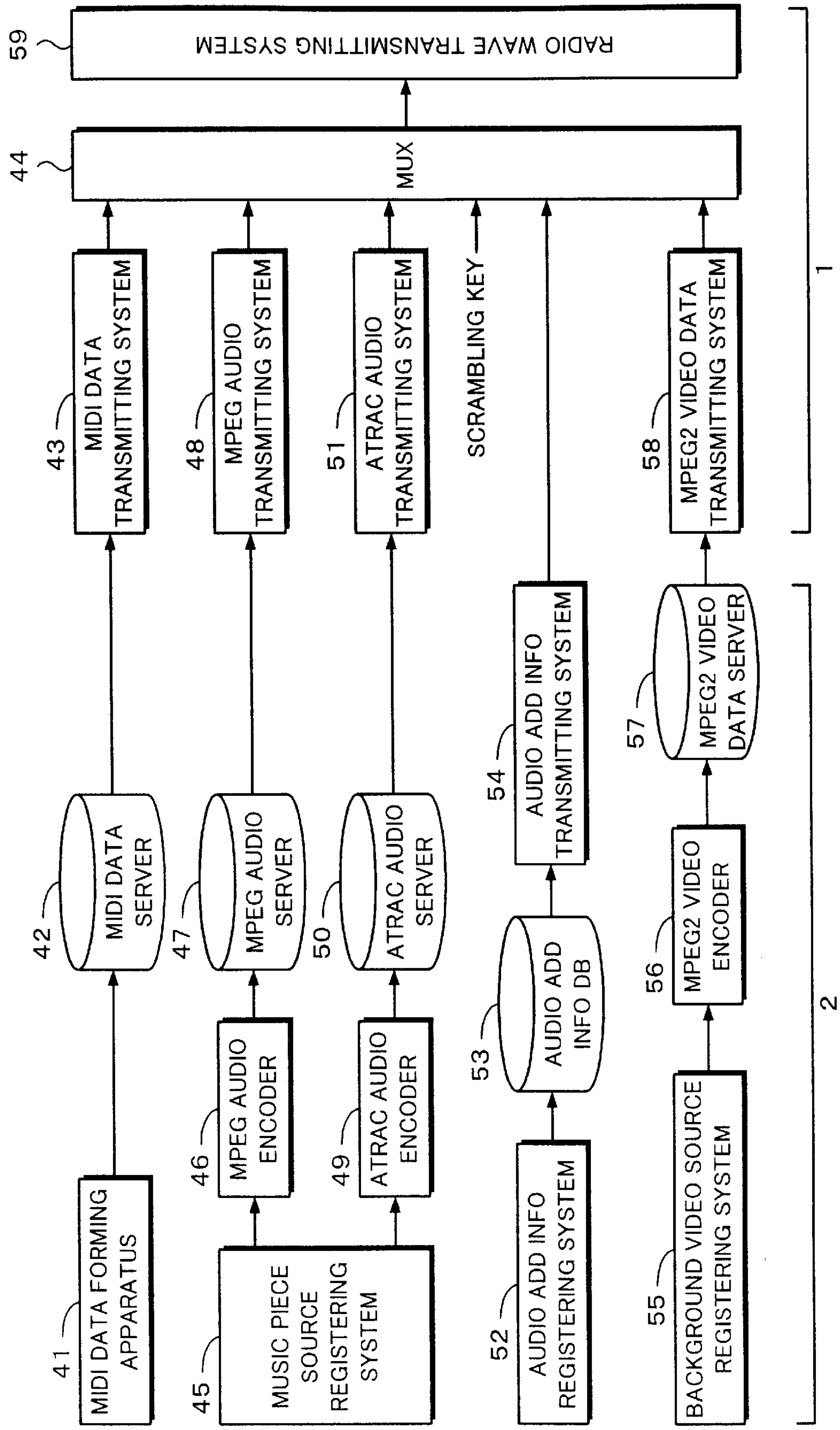
FIG. 2 is a block diagram of a music piece distributing apparatus in accordance with the invention.

FIG. 2 shows a detailed construction of the transmitting station in the music piece distributing system to which the invention is applied.

In FIG. 2, MIDI data formed by a MIDI data forming apparatus 41 is registered into a MIDI data server 42. The MIDI data registered in the MIDI data server 42 is sent to a MIDI data transmitting system 43 and is packetized and, after that, it is transmitted to a multiplexer 44. A music piece signal which is not yet compressed has been registered in a music piece source registering system 45. The music piece signal from the music piece source registering system 45 is supplied to a MPEG audio encoder 46 and an ATRAC audio encoder 49 and is encoded, respectively. After that, the encoded signals are registered into an MPEG audio server 47 and an ATRAC audio server 50. The MPEG audio data registered in the MPEG audio server 47 is sent to an MPEG audio transmitting system 48 and is packetized here and, after that, it is sent to the multiplexer 44. The ATRAC data registered in the ATRAC audio server 50 is sent to an ATRAC audio transmitting system 51 and is packetized and, after that, it is supplied to the multiplexer 44.

Further, audio additional information such as words of songs, music piece information, and the like from an audio additional information registering system 52 is registered into an audio additional information database 53. The audio additional information registered in the audio additional information database 53 is sent to an audio additional information transmitting system 54 and is packetized here and, after that, it is supplied to the multiplexer 44.

A video signal from a background video source registering system 55 is supplied to an MPEG2 video encoder 56 and is encoded and, after that, it is registered into an MPEG2 video data server 57. The MPEG2 video data registered in the MPEG2 video data server is sent to an MPEG2 video data transmitting system 58 and is packetized here and, after that, it is supplied to the multiplexer 44.

In the multiplexer 44, the MIDI data packet from the MIDI data transmitting system 43, the MPEG audio packet from the MPEG audio transmitting system 48, the ATRAC audio packet from the ATRAC audio transmitting system 51, the audio additional information packet from the audio additional information transmitting system 54, and the MPEG2 data packet from the MPEG2 video data transmitting system 58 are time-base multiplexed and are enciphered by using a scrambling key.

An output of the multiplexer 44 is sent to a radio wave transmitting system 59 and is subjected to processes such as error correction coding of a convolution code, a Reed Solomon code, or the like, QPSK (Quadrature Phase Shift Keying) modulation, frequency conversion, and the like here. After that, the processed signal is transmitted from an antenna to the satellite 4.

Figure 3:
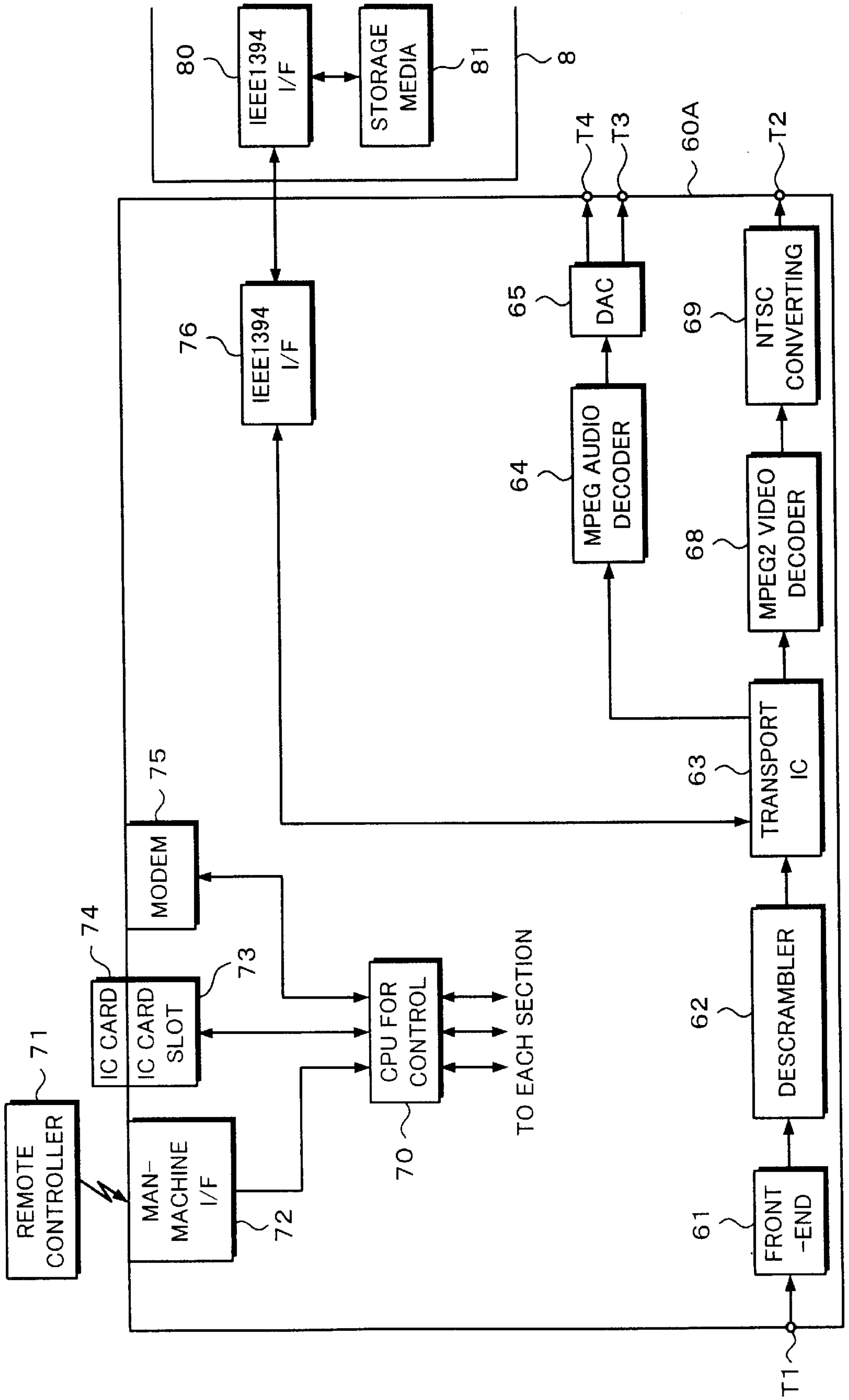
FIG. 3 is a block diagram of a music piece receiving apparatus in accordance with the invention applied.

FIG. 3 shows an example of a detailed construction of a receiver 60A in which the receiving apparatus 5 and decoder 6 are integratedly constructed.

The signal received by the satellite broadcasting antenna is supplied through an input terminal T1 to the receiving apparatus 5 comprising a front-end 61, a descrambler 62, and a transport IC (demultiplexer) 63.

The reception signal inputted to the input terminal T1 is supplied to the front-end 61. The front-end 61 is constructed by a tuner, a QPSK demodulator, and an error correcting circuit. On the basis of a set signal from a CPU (Central Processing Unit) 70 for control, a signal of a predetermined carrier frequency is selected from the reception signal by the tuner in the front-end 61. The reception signal is demodulated by the QPSK demodulator. A Viterbi decoding and an error correcting process of the Reed Solomon code or the like are executed in the error correcting circuit. A scrambled MPEG transport stream is outputted.

An output of the front-end 61 is supplied to the descrambler 62. The CPU 70 compares reception qualification information included in the reception signal with identification information of the receiver stored in an IC card 74 inserted in an IC card slot 73, thereby discriminating whether the reception signal is a signal transmitted to the receiver itself or not. When the reception qualification information included in the reception signal and the identification information of the receiver stored in the IC card 74 coincide, it is recognized that the reception signal is the signal transmitted to the receiver itself. A control signal is generated to the descrambler 62 so as to execute a descrambling process. On the contrary, when the reception qualification information included in the reception signal and the identification information of the receiver stored in the IC card 74 do not coincide, it is recognized that the reception signal is not the signal transmitted to the receiver. The descrambling process is not performed.

The MPEG transport stream descrambled in the descrambler 62 is sent to the transport IC 63.

On the basis of a command from the CPU 70, the transport IC 63 separates a desired transport packet from the stream from the descrambler 62. A packet identifier (PID) showing the kind of transmission data is provided in a header portion of the transport packet. The transport IC 63 detects the PID. The transport packet to transmit the MPEG2 video data is supplied to an MPEG2 video decoder 68. The transport packet to transmit the MPEG audio data is supplied to an MPEG audio decoder 64.

Since the receiver 60A in FIG. 3 does not correspond to the ATRAC audio data or MIDI data, the transport packet to transmit those data is not separated by the transport IC 63 and the data is thrown away.

The MPEG2 video decoder 68 receives the transport packet of the MPEG2 video data from the transport IC 63 and executes a decoding process of the MPEG2 video system, thereby forming the video data before the data compression. The video data is supplied to an NTSC converting circuit 69 and is converted into a composite video signal and is converted into an analog signal by the NTSC converting circuit 69. An output of the NTSC converting circuit 69 is outputted as a background video signal to the KARAOKE apparatus 7 from an analog video output terminal T2.

The MPEG audio decoder 64 receives the transport packet of the MPEG audio data from the transport IC 63 and executes an audio decoding process of the MPEG audio system, thereby forming the audio data before the data compression. The decoded audio data is converted into an analog audio signal by a D/A converter 65 and, after that, it is outputted to the KARAOKE apparatus 7 from analog audio output terminals T3 and T4. The audio data decoded by the MPEG audio decoder 64 can be also outputted to the KARAOKE apparatus 7 through an optical digital output interface.

Further, the transport IC 63 separates the audio additional information packet included in the transport stream and supplies it to the CPU 70. The CPU 70 processes the supplied audio additional information and superimposes it to the background video signal which was subjected to the decoding process by the MPEG2 video decoder 68.

For example, when a words button (not shown) provided for a remote controller 71 is depressed, text data of the words sent as audio additional information is supplied from the CPU 70 to the MPEG2 video decoder 68. The superimposing process is executed by using an OSD (On Screen Display) function of the MPEG2 video decoder 68. The audio sound of the music piece is generated from speakers of the KARAOKE apparatus 7 as mentioned above and, at the same time, a background video image in which the words have been superimposed is displayed synchronously with the audio sound.

A modem 75 (corresponding to the request communication terminal 9) connected to the CPU 70 is provided for the receiver 60A. Through the modem, the music piece identification number of the requested music piece and information showing a decodable compressing system (MPEG audio in case of FIG. 3) are transmitted to the data distribution control apparatus 3 via the public line 10 as will be explained hereinlater.

Further, an IEEE1394 interface 76 is connected to the transport IC 63. The IEEE1394 is a bidirectional serial interface which can transmit data of a large capacity and commands at a high speed. Music piece data can be transmitted and received to/from the storage device 8 through the IEEE1394 interface 76.

That is, the transport packet to transmit the MPEG2 video data separated by the transport IC 63, the transport packet to transmit the MPEG audio data, and the transport packet to transmit the audio additional information are transmitted to the IEEE1394 interface 76 and are subjected to a predetermined packetizing process for transmitting them on a serial path. After that, the processed data is transmitted to the storage device 8.

The storage device 8 is constructed by an IEEE1394 interface 80 and a storage media 81. The data transmitted from the receiver 60A via an IEEE1394 path is supplied to the IEEE1394 interface 80 and is depacketized. The transport packet to transmit the depacketized MPEG2 video data, the transport packet to transmit the MPEG audio data, and the transport packet to transmit the audio additional information are recorded to the storage media 81 under control of a controller (not shown) in the storage device 8.

When a predetermined operation is executed by the remote controller 71 of the receiver 60A and a music piece is requested, the CPU 70 generates a command to examine whether the requested music piece data has been recorded in the storage media 81 or not. The CPU 70 transmits this command to the storage device 8 through the IEEE1394 interface 76. A controller (not shown) of the storage device 8 receives the command through the IEEE1394 interface 80 and determines whether the requested music piece has been recorded in the storage media 81 or not. A determination result is provided to the CPU 70 of the receiver 60A through the IEEE1394 interface. That is, if a fact that the data of the requested music piece has been recorded in the storage media 81 can be detected, this fact is notified to the CPU 70 of the receiver 60A through the IEEE1394 interface 80. The MPEG audio data of the music piece, the MPEG2 video data as a background video image, and the audio additional information including the words and the like are read out from the storage media 81 and are transmitted to the receiver 60A through the IEEE1394 interface 80. On the contrary, if the data of the requested music piece is not recorded in the storage media 81, this fact is notified to the CPU 70 of the receiver 60A through the IEEE1394 interface 80.

When the data of the requested music piece has been recorded in the storage media 81, the receiver 60A supplies the MPEG audio data, MPEG2 video data, and audio additional information of the music piece sent from the storage device 8 to the transport IC 63. The transport IC 63 identifies the PID as mentioned above, supplies the MPEG audio data and the MPEG2 video data to the decoders 64 and 68 and supplies the audio additional information to the CPU 70.

When the data of the requested music piece is not recorded in the storage media 81, the CPU 70 requests a distribution of the music piece data through the modem 75.

Figure 4:
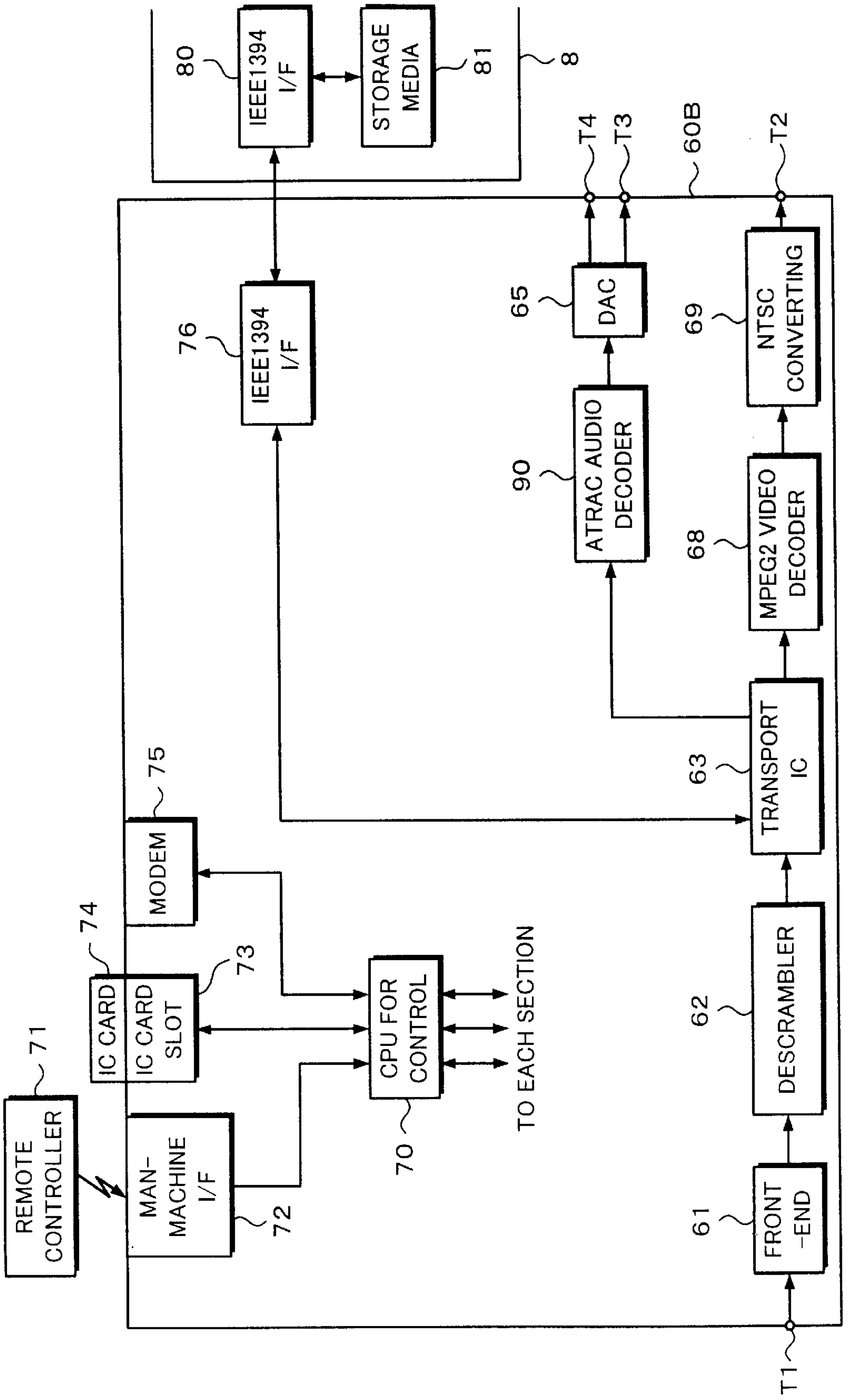
FIG. 4 is a block diagram of a music piece receiving apparatus in accordance with the invention.

FIG. 4 shows another example of a detailed construction of a receiver 60B in which the receiving apparatus 5 and decoder 6 are integratedly constructed. The same constructing portions as those in FIG. 3 are designated by the same reference numerals and their descriptions are omitted.

In the receiver 60B shown in FIG. 4, an ATRAC audio decoder 90 is provided in place of the MPEG audio decoder 64 in FIG. 3. A construction of the other portions is substantially the same as that of the receiver 60A in FIG. 3.

However, the transport IC 63 detects the PID. The transport packet to transmit the MPEG2 video data is supplied to the MPEG2 video decoder 68. The transport packet to transmit ATRAC audio data is supplied to the ATRAC audio decoder 90. Since the receiver 60B in FIG. 4 does not correspond to the MPEG audio data and MIDI data, the transport packet to transmit those data is not separated by the transport IC 63 but the data is thrown away.

The ATRAC audio decoder 90 receives the transport packet of the ATRAC audio data from the transport IC 63 and executes an audio decoding process of the ATRAC system, thereby forming the audio data before data compression. The audio data before the data compression is formed by performing the decoded audio process. The decoded audio data is converted into an analog audio signal by the D/A converter 65 and, after that, it is outputted to the KARAOKE apparatus 7 from the analog audio output terminals T3 and T4. The audio data decoded by the ATRAC audio decoder 90 can be also outputted to the KARAOKE apparatus 7 through an optical digital output interface.

The modem 75 (corresponding to the request communication terminal 9) connected to the CPU 70 is provided for the receiver 60B in a manner similar to the case of FIG. 3. Through the modem, the music piece identification number of the requested music piece and information showing a decodable compressing system (ATRAC audio in case of FIG. 4) are transmitted to the data distribution control apparatus 3 via the public line 10.

Further, the IEEE1394 interface 76 is connected to the transport IC 63. The ATRAC audio data, MPEG2 video data, and audio additional information can be transmitted and received to/from the storage device 8 in a manner similar to the case of FIG. 3.

Figure 5:
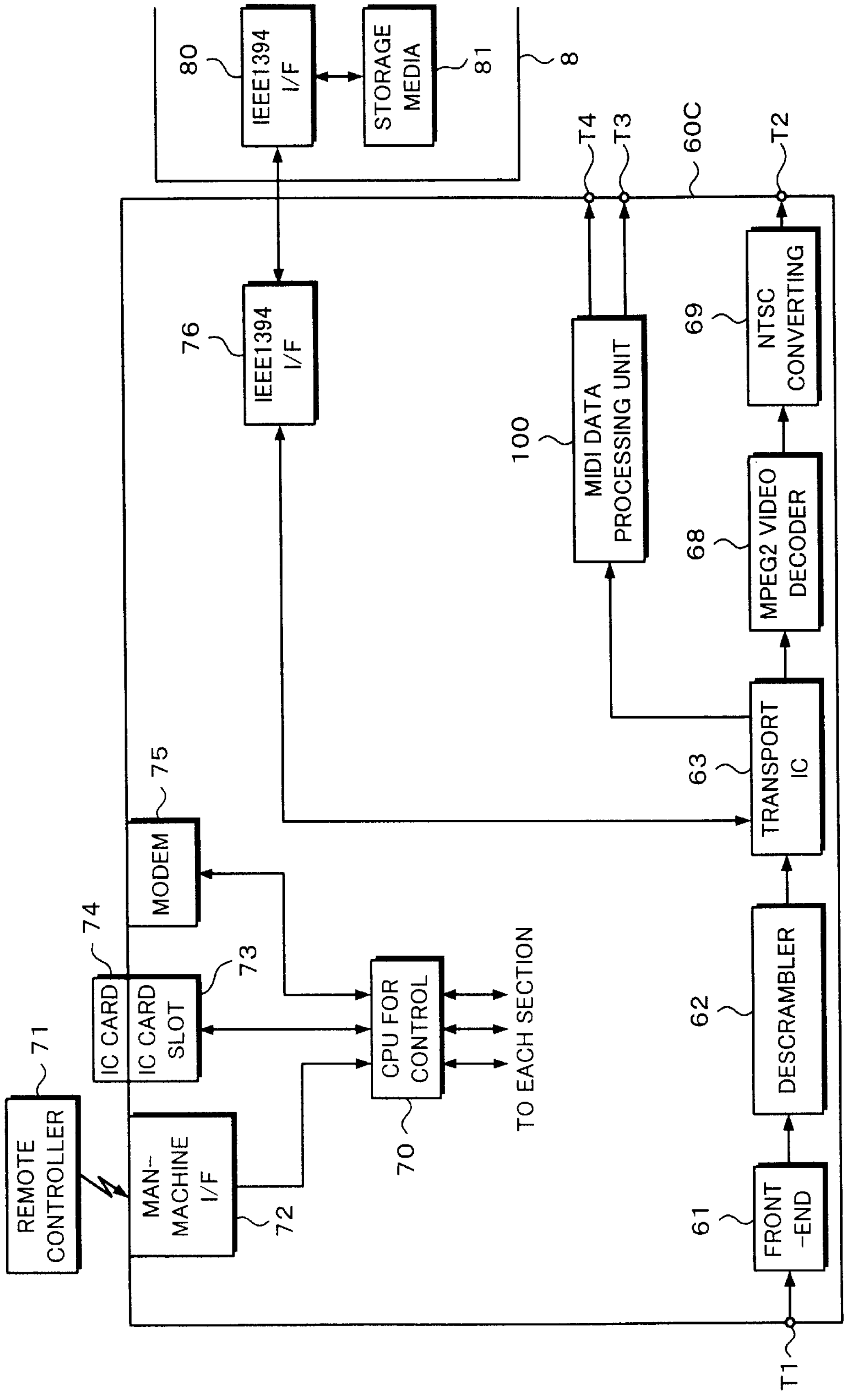
FIG. 5 is a block diagram of a music piece receiving apparatus in accordance with the invention.

FIG. 5 shows another example of a detailed construction of a receiver 60C in which the receiving apparatus 5 and decoder 6 are integratedly constructed. The same constructing portions as those in FIG. 3 or 4 are designated by the same reference numerals and their descriptions are omitted.

In the receiver 60C shown in FIG. 5, a MIDI data processing unit 100 is provided in place of the MPEG audio decoder 64 or ATRAC audio decoder 90 in FIG. 3 or 4. A construction of the other portions is substantially the same as that of the receiver 60A or 60B in FIG. 3 or 4.

However, the transport IC 63 detects the PID. The transport packet to transmit the MPEG2 video data is supplied to the MPEG2 video decoder 68. The transport packet to transmit MIDI data is supplied to the MIDI data processing unit 100. Since the receiver 60C in FIG. 5 does not correspond to the MPEG audio data and ATRAC audio data, the transport packet to transmit those data is not separated by the transport IC 63 but the data is thrown away.

The MIDI data processing unit 100 receives the transport packet of the MIDI data from the transport IC 63 and executes an audio process. The output audio signal is outputted to the KARAOKE apparatus 7 from the analog audio output terminals T3 and T4.

The modem 75 (corresponding to the request communication terminal 9) connected to the CPU 70 is provided for the receiver 60C in a manner similar to the case of FIG. 3 or 4. Through the modem, the music piece identification number of the requested music piece and information showing a decodable compressing system (MIDI data in case of FIG. 3) are transmitted to the data distribution control apparatus 3 via the public line 10. Further, the IEEE1394 interface 76 is connected to the transport IC 63. The MIDI data, MPEG2 video data, and audio additional information can be transmitted and received to/from the storage device 8 in a manner similar to the case of FIG. 3.

Figure 6:
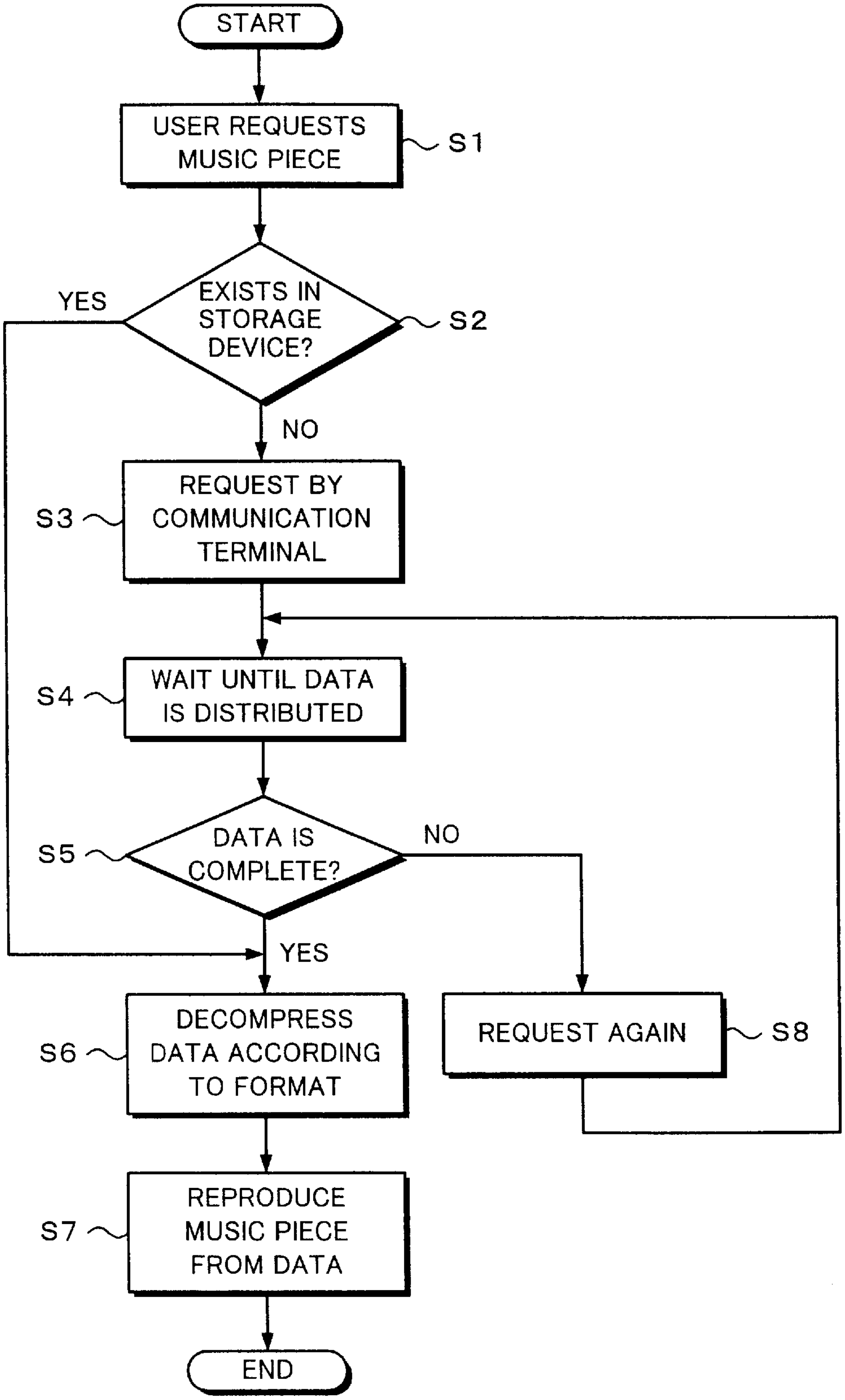
FIG. 6 is a flowchart of an example of the processes of a KARAOKE apparatus in accordance with the invention.

An example of a method of distributing the music piece data will now be described by using flowcharts of FIGS. 6 and 7. First, FIG. 6 is a flowchart for the operation on the receiver side to receive the compressed music piece data. This flowchart is common for the receivers 60A, 60B, and 60C described in FIGS. 3, 4, and 5. In step S1, the user selects a requested music piece by the receiver 60. That is, the user inputs the identification number allocated to a desired music piece to the receiver 60 by the remote controller 71 with reference to a book in which a music piece list has been written, so that he can select the requested music piece. In step S2, a check is made to see if the music piece data of the selected requested music piece exists in the storage device 8 in which the music piece data has been stored. If there is the music piece data in the storage device 8, the processing routine advances to step S6. When there is not the music piece data, step S3 follows.

In step S3, since the music piece data of the request music piece does not exist in the storage device 8, a request to designate the identification number of the music piece and the reproducible compressing system is sent to the data distribution control apparatus 3 by the request communication terminal 9 through the public line 10 such as a telephone line or the like. In step S4, after the request was performed, the user waits until the desired music piece data is received by the receiver 60. In step S5, when the music piece data is distributed, a check is made to see if the music piece data is perfect. If it is determined that the music piece data is perfect, step S6 follows. When it is decided that the music piece data is imperfect, step S8 follows. In step S8, the selected music piece is again requested by the request communication terminal 9 and the user waits until the desired music piece data can be received by the receiver 60 (step S4). When the distributed music piece data is the perfect data, the compressing system is confirmed and the decompressing process is performed in the decoder 6 in step S6. In step S7, the decompressed music piece data is reproduced by the KARAOKE apparatus 7.

Figure 7:
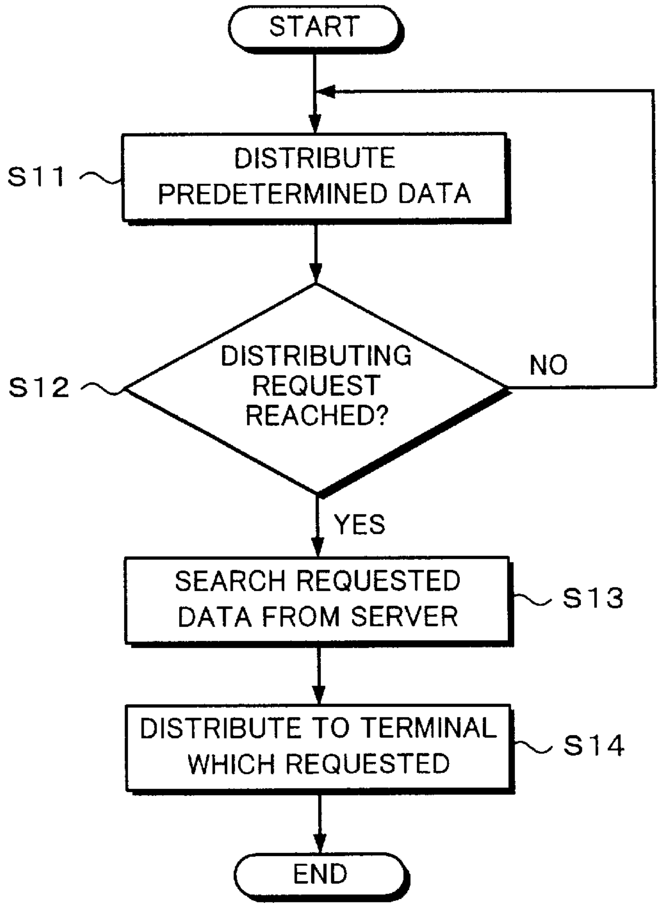

FIG. 7 is a flowchart showing the operation of the apparatus on the broadcasting station side for distributing the compressed music piece data as an example. In step S11, when there is no request of the music piece, the music piece data of a new music or the like is automatically distributed by the data distribution control apparatus 3. In step S12, a check is made to see if the request has been sent to the data distribution control apparatus 3 through the public line 10. When the request is not yet sent, the processing routine advances to step S11. When the request is supplied, step S13 follows. In step S13, the music piece data of the designated compressing system is searched and extracted from the music piece server 2. In step S14, the extracted music piece data is distributed through the digital satellite broadcasting equipment 1.

Figure 8:
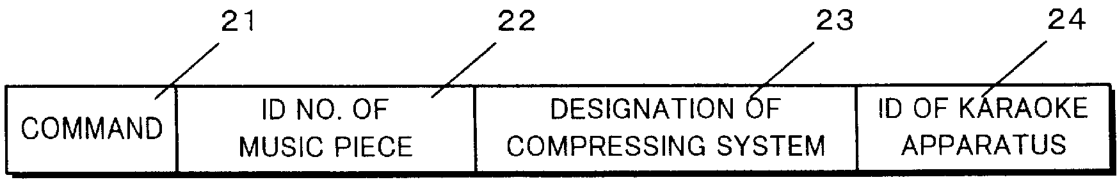
FIG. 8 is a constructional example of request data in accordance with the invention.

FIG. 8 shows a construction of an example of the request data to be transmitted by the request communication terminal 9 to the data distribution control apparatus 3 through the public line 10. A command 21 showing the request, an identification number 22 of the music piece selected by the user, and compressing system designation data 23 which can be reproduced by the KARAOKE apparatus side are designated for the request data. Further, an identification number 24 (also stored in the IC card 74) of the KARAOKE apparatus to specify the receivable KARAOKE apparatus when the requested music piece data is distributed through the digital satellite broadcasting is also transmitted as request data.

Figure 9:
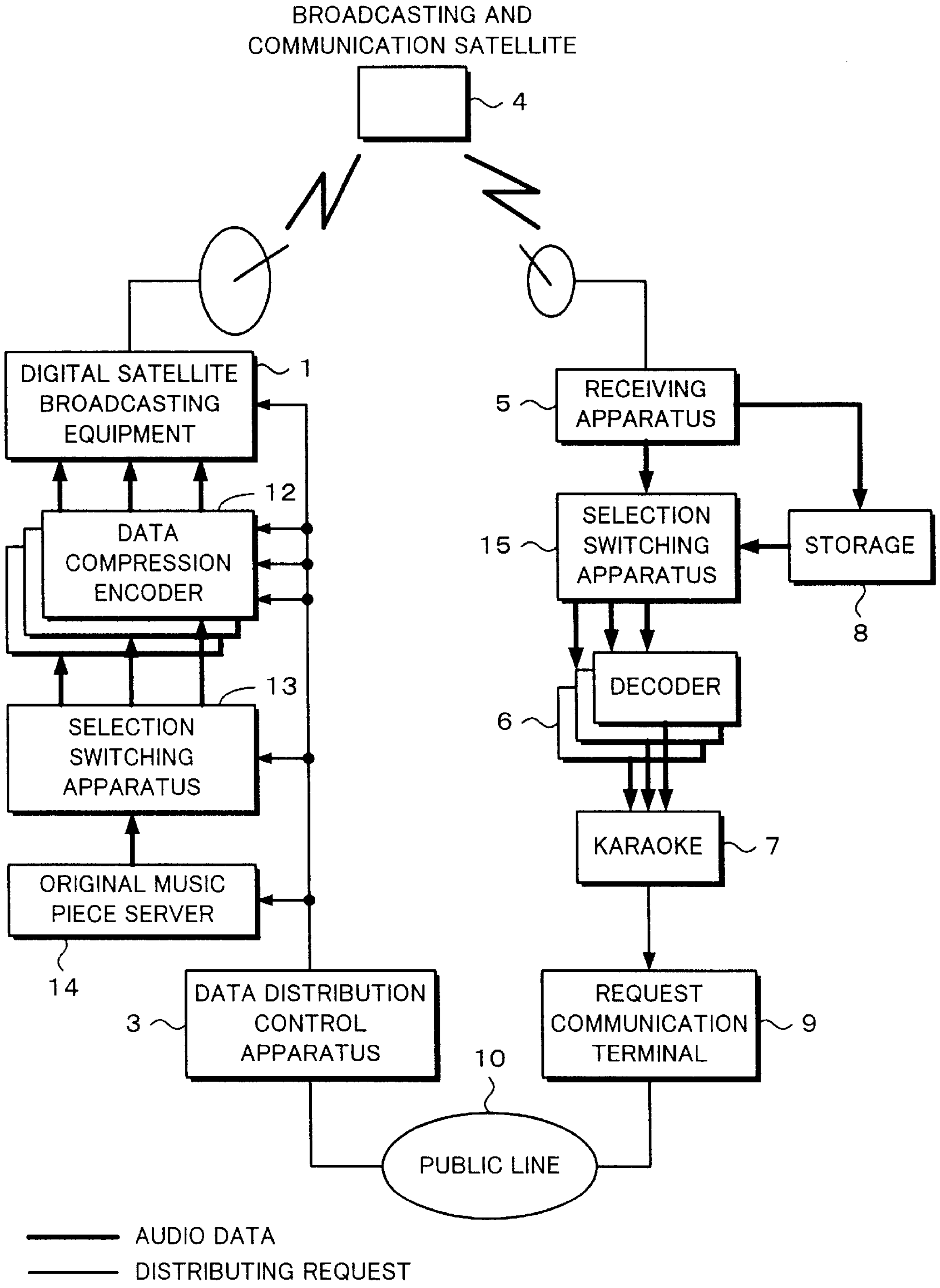
FIG. 9 is a block diagram of an another system in accordance with the invention is applied.

FIG. 9 shows a block diagram of another example of the embodiment of the invention. In this example, the operations such that the music piece data which has previously been compressed by a plurality of compressing systems on the distributing system side is stored into the music piece server and the requested music piece is searched from the music pieces stored in the music piece server as mentioned above are not performed but the music piece data is compressed in a real-time manner by the designated compressing system and is transmitted. That is, the music piece signal which is not compressed has been stored in a music piece server 14. The requested music piece is searched and extracted from the music piece server 14 on the basis of the request from the receiver side. Any one of a plurality of data compression encoders 12 of different compressing systems provided so that the music piece data can be distributed by the designated compressing system is selected by a selection switching apparatus 13. The music piece data is compressed by the designated compressing system and is transmitted. The music piece data compressed as mentioned above is distributed through the digital satellite broadcasting equipment 1 to the receiver side which requested.

On the receiver side, a proper one of the decoders 6 corresponding to a plurality of different compressing systems is selected by a selection switching apparatus 15 on the basis of the compressing system of the music piece data received by the receiving apparatus 5. The decoder 6 selected as mentioned above decompresses the received music piece data and supplies to the KARAOKE apparatus 7. Further, the received music piece data is supplied and stored into the storage device 8.

Figure 10:
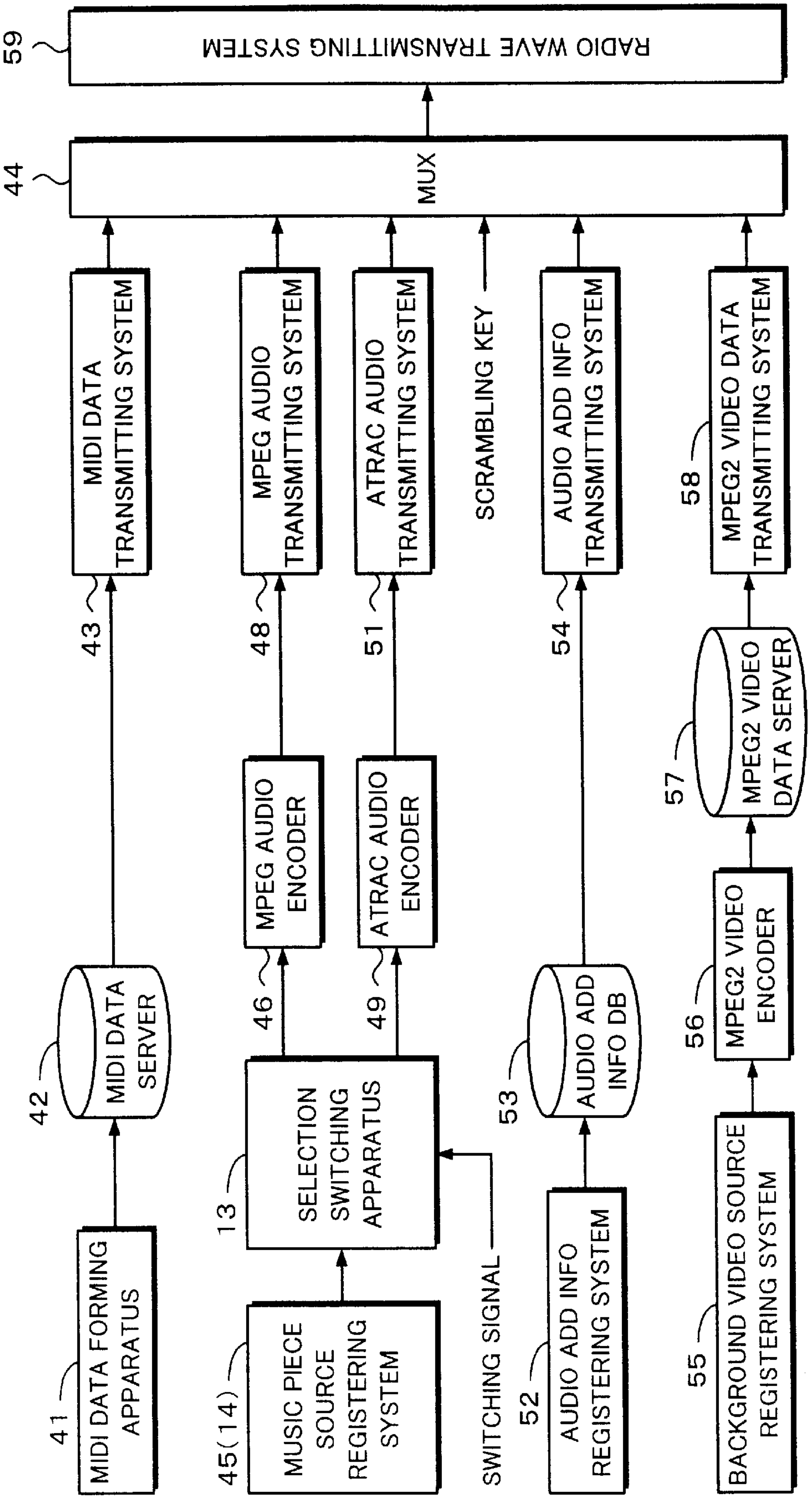
FIG. 10 is a block diagram of an another music piece distributing apparatus in accordance with the invention.

FIG. 10 shows a detailed construction of a transmitting station in a music piece distributing system to which another example of the invention is applied.

In FIG. 10, the MIDI data formed by the MIDI data forming apparatus 41 is registered into the MIDI data server 42. The MIDI data registered in the MIDI data server 42 is sent to the MIDI data transmitting system 43 and is packetized and, after that, it is supplied to the multiplexer 44. Since it is difficult to perform the encoding process in a real-time manner to the MIDI data, the MIDI data is preliminarily encoded and registered into the MIDI data server 42.

The music piece signal which is not compressed has been registered in the music piece source registering system 45 (corresponding to 14 in FIG. 9). The music piece signal from the music piece source registering system 45 is supplied to the MPEG audio encoder 46 and ATRAC audio encoder 49 through the selection switching apparatus 13 and are encoded, respectively. After that, the encoded signals are transmitted to the MPEG audio transmitting system 48 and ATRAC audio transmitting system 51 and are packetized here and, after that, they are sent to the multiplexer 44. A switching signal from the data distribution control apparatus 3 (FIG. 9) is supplied to the selection switching apparatus 13. In response to the switching signal, the music piece signal from the music piece source registering system 45 is selectively supplied to the MPEG audio encoder 46 or ATRAC audio encoder 49.

Further, the audio additional information such as words, music piece information, and the like from the audio additional information registering system 52 is registered into the audio additional information database 53. The audio additional information registered in the audio additional information database 53 is sent to the audio additional information transmitting system 54 and is packetized and, after that, it is sent to the multiplexer 44.

The video signal from the background video source registering system 55 is supplied to the MPEG2 video encoder 56 and is encoded and, after that, it is registered into the MPEG2 video data server 57. The MPEG2 video data registered in the MPEG2 video data server is sent to the MPEG2 video data transmitting system 58 and is packetized and, after that, it is supplied to the multiplexer 44.

In the multiplexer 44, the MIDI data packet from the MIDI data transmitting system 43, the MPEG audio packet from the MPEG audio transmitting system 48, the ATRAC audio packet from the ATRAC audio transmitting system 51, the audio additional information packet from the audio additional information transmitting system 54, and the MPEG2 data packet from the MPEG2 video data transmitting system 58 are time-base multiplexed and are enciphered by using a scrambling key.

An output of the multiplexer 44 is transferred to the radio wave transmitting system 59 and processes such as error correction coding of a convolution code, a Reed Solomon code, or the like, QPSK modulation, frequency conversion, and the like are executed here. After that, the processed signal is transmitted from the antenna to the satellite 4.

Figure 11:
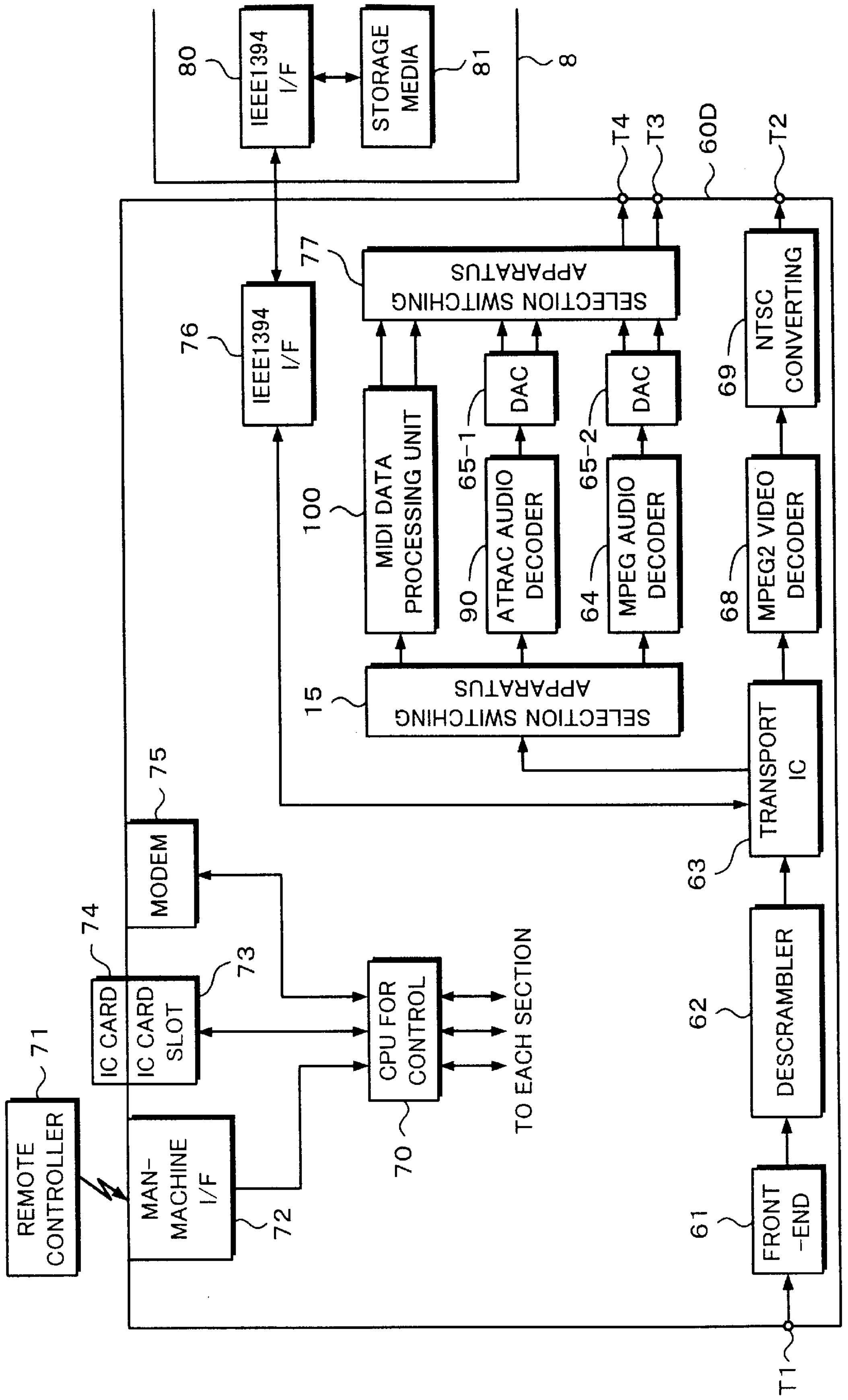
FIG. 11 is a block diagram of an another music piece receiving apparatus in accordance with the invention is applied.

FIG. 11 shows an example of a detailed construction of a receiver 60D in which the receiving apparatus 5 and decoder 6 are integratedly constructed and to which another example of the invention is applied. The same constructing portions as those in FIGS. 3, 4, and 5 are designated by the same reference numerals and their descriptions are omitted.

On the basis of a command from the CPU 70, the transport IC 63 separates a desired transport packet from the stream from the descrambler 62. A packet identifier (PID) showing the kind of transmission data is provided in a header portion of the transport packet. The transport IC 63 detects the PID. The transport packet to transmit the MPEG2 video data is supplied to the MPEG2 video decoder 68. The transport packet to transmit the audio additional information is supplied to the CPU 70. The CPU 70 processes the supplied audio additional information and superimposes to the background video signal decoded by the MPEG2 video decoder 68.

The CPU 70 controls selection switching apparatuses 15 and 77 so as to select the audio decoder corresponding to the compressing system of the requested music piece. That is, the selection switching apparatuses 15 and 77 are controlled as follows. When the music piece is requested by the compressing system of the MPEG audio, the MPEG audio decoder 64 is selected. When the music piece is requested by the compressing system of the ATRAC audio, the ATRAC audio decoder 90 is selected. When the music piece is requested by the MIDI system, the MIDI data processing unit 100 is selected.

The MPEG audio decoder 64 receives the transport packet of the MPEG audio data from the selection switching apparatus 15 and executes an audio decoding process of the MPEG audio system, thereby forming the audio data before the data compression. The decoded audio data is converted into an analog audio signal by a D/A converter 65-2 and, after that, it is supplied to the selection switching apparatus 77.

The ATRAC audio decoder 90 receives the transport packet of the ATRAC audio data from the selection switching apparatus 15 and executes the audio decoding process of the ATRAC system, thereby forming the audio data before the data compression. The decoded audio data is converted into an analog audio signal by a D/A converter 65-1 and, after that, it is supplied to the selection switching apparatus 77.

The MIDI data processing unit 100 receives the transport packet of the MIDI data from the selection switching apparatus 15 and executes an audio process and supplies an output signal to the selection switching apparatus 77.

The analog audio signal supplied to the selection switching apparatus 77 is outputted to the KARAOKE apparatus 7 from the analog audio output terminals T3 and T4.

The modem 75 (corresponding to the request communication terminal 9) connected to the CPU 70 is provided for the receiver 60D. Through the modem, the music piece identification number of the requested music piece and information showing a desired compressing system (MPEG audio in case of FIG. 3) are transmitted to the data distribution control apparatus 3 via the public line 10.

Further, the IEEE1394 interface 76 is connected to the transport IC 63. The transport packet to transmit the MPEG2 video data separated by the transport IC 63, the transport packet to transmit the MPEG audio data, ATRAC audio data, or MIDI data, and the transport packet to transmit the audio additional information are transmitted to the IEEE1394 interface 76. A predetermined packetizing process to transmit those packets on a serial path is performed. After that, the resultant signal is transmitted to the storage device 8 and is recorded into the storage media 81.

When a predetermined operation is executed by the remote controller 71 of the receiver 60D and a music piece is requested, the CPU 70 generates a command to examine whether the requested music piece data has been recorded in the storage media 81 or not. The CPU 70 transmits this command to the storage device 8 through the IEEE1394 interface 76. A controller (not shown) of the storage device 8 receives the command through the IEEE1394 interface 80 and determines whether the requested music piece has been recorded in the storage media 81 or not. A discrimination result is provided to the CPU 70 of the receiver 60D through the IEEE1394 interface. That is, if a fact that the data of the requested music piece has been recorded in the storage media 81 can be detected, this fact is notified to the CPU 70 of the receiver 60D through the IEEE1394 interface 80. The audio data (compressed by any one of the MPEG audio, ATRAC audio, and MIDI data) of the music piece, the MPEG2 video data as a background video image, and the audio additional information including the words and the like are read out from the storage media 81 and are transmitted to the receiver 60D through the IEEE1394 interface 80. On the contrary, if the data of the requested music piece is not recorded in the storage media 81, this fact is notified to the CPU 70 of the receiver 60D through the IEEE1394 interface 80.

When the data of the requested music piece has been recorded in the storage media 81, the receiver 60D supplies the audio data of the music piece, the MPEG2 video data, and the audio additional information sent from the storage device 8 to the transport IC 63. The transport IC 63 identifies the PID as mentioned above, supplies the MPEG2 video data to the MPEG2 video decoder 68 and supplies the audio additional information to the CPU 70. The CPU 70 controls the selection switching apparatuses 15 and 77 on the basis of the compression identification information supplied from the transport IC 63. That is, the selection switching apparatuses 15 and 77 are controlled as follows. In the case where the audio data transmitted from the IEEE1394 interface 76 is based on the compressing system of the MPEG audio, the MPEG audio decoder 64 is selected. In case of the compressing system being ATRAC audio, the ATRAC audio decoder 90 is selected. In case of the MIDI system, the MIDI data processing unit 100 is selected.

The audio data supplied through the IEEE1394 interface 76 as mentioned above is processed by any one of the MPEG audio decoder 64, ATRAC audio decoder 90, and MIDI data processing unit 100 and is outputted to the KARAOKE apparatus 7 from the analog audio output terminals T3 and T4 through the selection switching apparatus 77.

Figure 12:
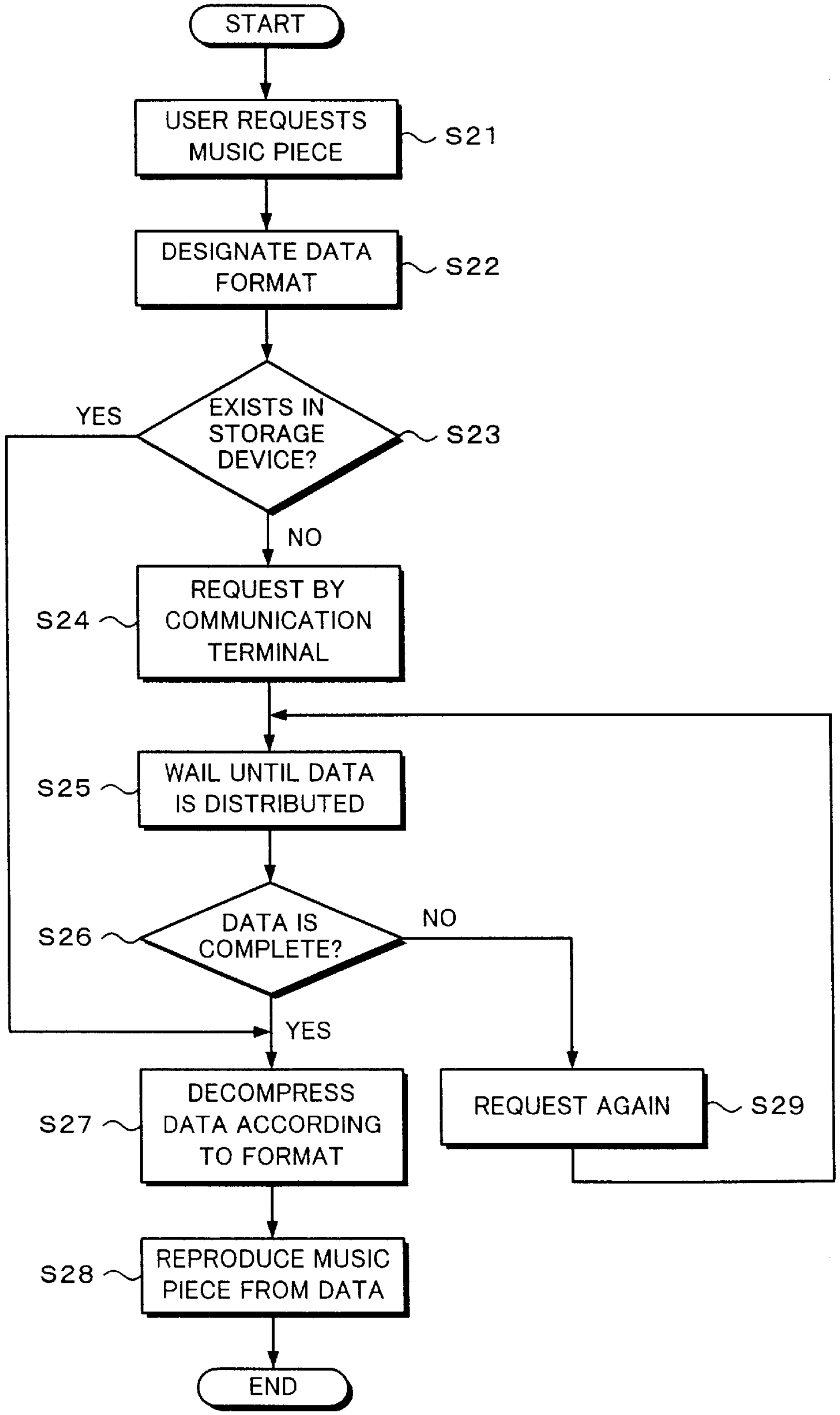
FIG. 12 is a flowchart showing an another example of the processes of a KARAOKE apparatus in accordance with the invention.

An example of methods of distributing music piece data using the systems of FIGS. 9–11 will now be described with reference to the flowcharts of FIGS. 12 and 13. First, FIG. 12 is a flowchart for the operation of an example on the receiver side for receiving the compressed music piece data. In step S21, the user selects a requested music piece by the receiver 60. A method of selecting the requested music piece is the same as that mentioned above. In step S22, a compressing system of the music piece data which is distributed is designated. There is also a possibility such that the sound quality of the music piece differs depending on the designated compressing system. In step S23, a check is made to see if the selected music piece data has been stored in the storage device 8. If the music piece data has been stored in the storage device 8, the processing routine advances to step S27. When the music piece data is not stored, step S24 follows.

In step S24, a request containing the identification number of the music piece and the compressing system for its distribution is transmitted to the data distribution control apparatus 3 through the public line 10 by the request communication terminal 9. In step S25, the user waits until the requested music piece data can be received by the receiving apparatus 5. In step S26, if the music piece data was distributed, a check is made to see if the data is perfect. When the data is determined to be perfect, step S27 follows. When the data is decided to be imperfect, step S29 follows. In step S29, since the data is imperfect, the selected music piece is again requested by the request communication terminal 9 and step S25 follows. In step S27, the decoder 6 corresponding to the compressing system of the received music piece data is selected by the selection switching apparatus 15 and the music piece data is decompressed. In step S28, the decompressed music piece data is reproduced by the KARAOKE apparatus 7.

Figure 13:
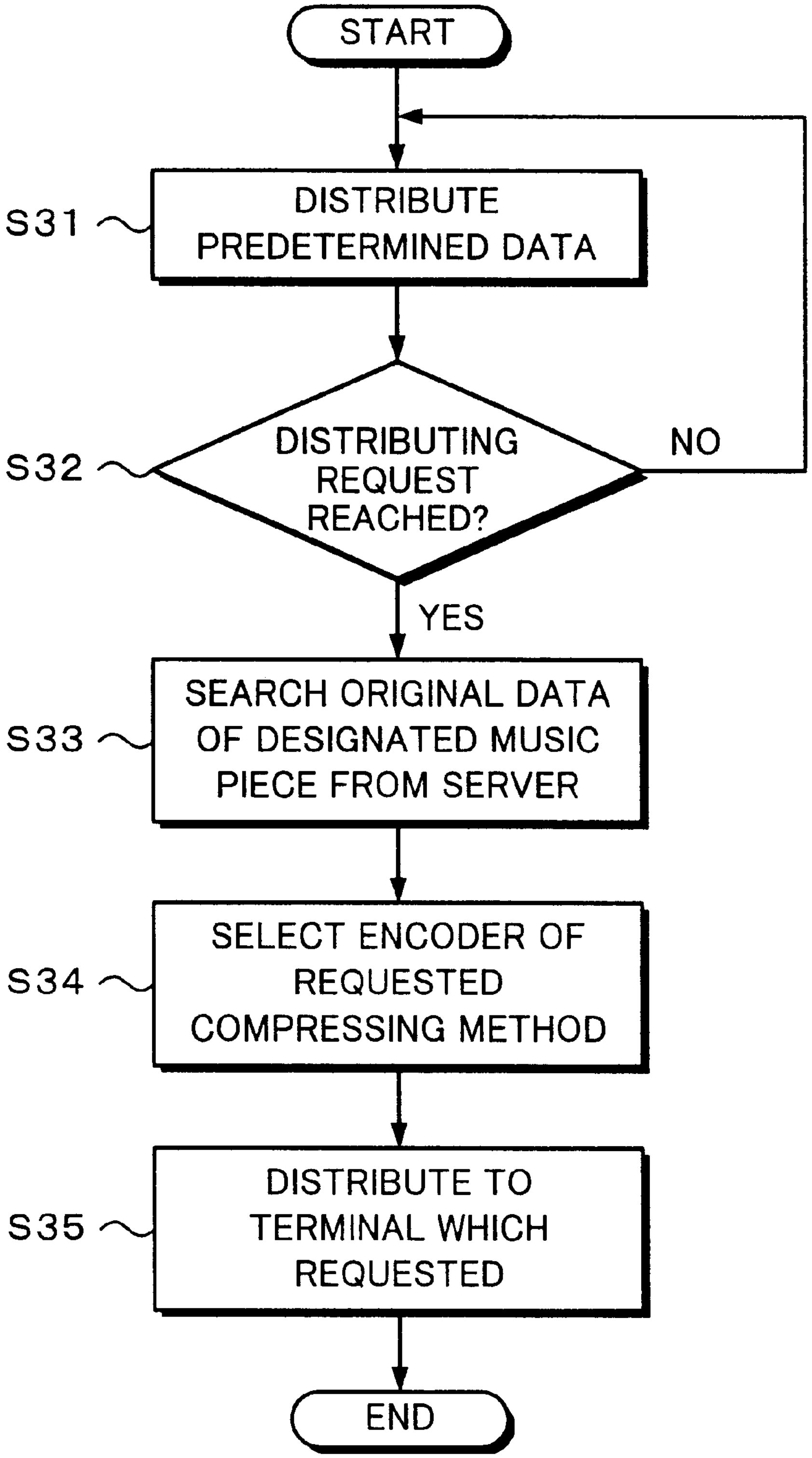
FIG. 13 is a flowchart showing another example on the broadcasting station side in accordance with the invention is applied.

FIG. 13 is the flowchart for the operation of an example on the broadcasting station side for distributing the compressed music piece data. In step S31, when there is no request of a music piece, music piece data of a new song or the like is automatically distributed by the data distribution control apparatus 3. In step S32, a check is made to see if the request of the music piece has been transmitted to the data distribution control apparatus 3 through the public line 10. If there is no request, step S31 follows. If the request is supplied, step S33 follows. In step S33, the music piece requested by the request is searched and extracted from the music piece server 14. In step S34, as for the extracted music piece data, the compression encoder 12 corresponding to the requested compressing system is selected by the selection switching apparatus 13. The extracted music piece signal is compressed by the requested compressing system. In step S35, the music piece data compressed as mentioned above is distributed through the digital satellite broadcasting equipment 1 to the KARAOKE apparatus which requested.

Although the embodiment has been described on the assumption that there is only the music piece server 2 provided on the broadcasting station side or the original music piece server 14, both of the music piece server 2 and the original music piece server 14 can be also combined and provided on the broadcasting station side. As an example of the operation in this instance, when there is a request of the music piece from the KARAOKE apparatus, the music piece server 2 is first searched. When there is the music piece data of the requested compressing system, the music piece data is distributed to the KARAOKE apparatus which requested. When the music piece data of the requested compressing system does not exist in the music piece server 2, the music piece is searched and extracted from the music piece server 14. The data compression encoder 12 according to the requested compressing system is selected and the music piece data is compressed. After that, the compressed music piece data is distributed to the KARAOKE apparatus which requested.

In the embodiment, when the music piece is requested from the KARAOKE apparatus side to the distribution center, the public line is used. However, it is also possible to use an interactive image information system (CAPTAIN: Character And Pattern Telephone Access Information Network) for providing image information such as characters, figure, and the like in accordance with a request of the user by using a television receiver as a terminal and connecting it to the information center through the public line network. That is, it is also possible to use a VideoTex network which is used for accounting of the communication type KARAOKE system.

In the embodiment, the number of the public line can be also set for every compressing system requested from the KARAOKE apparatus. In this instance, since the number of the music piece which is inputted to the KARAOKE apparatus by the operator also differs for every compressing system, the number of the public line can be also set in accordance with the compressing system.

According to the invention, since the original music piece can be used as it is, the music piece data for KARAOKE can be easily formed. Further, the user can sing the original music piece without losing the mood of the music piece.

According to the invention, a troublesomeness for the inputting operation which is required when the MIDI data is formed is eliminated and an erroneous input of data can be prevented. That is, the music piece data can be formed even by a person who does not have a special technique. Further, since the operation to collect the scores or to confirm whether the mood is the same as that of the original music piece or not or the like is unnecessary, a period of time that is required to form data can be reduced.

According to the invention, the music piece data can be uniformly reproduced irrespective of the function and ability of a MIDI music source on the KARAOKE apparatus side. Further, since the music piece data is distributed in a compressing system format and in a data format such as MIDI or the like which have been designated, the data adapted to the function on the KARAOKE apparatus side can be transmitted.

What is claimed is:

1. A music piece distributing apparatus for distributing music piece data on the basis of a request from a remote receiver, characterized by comprising:

receiving means for receiving a request signal from said receiver including at least music piece identification information and compressing system identification information; and transmitting means for transmitting music piece data in which a music piece corresponding to the music piece identification information included in said received request signal has been compressed by a compressing system corresponding to the compressing system identification information included in the request signal.

2. A music piece receiving apparatus for requesting music piece data of a music piece selected by the user to a remote music piece distributing apparatus and receiving and outputting the music piece data distributed from the music piece distributing apparatus, characterized by comprising:

forming means for forming a request signal including at least music piece identification information to identify said selected music piece and compressing system identification information to identify a compressing system when the music piece is distributed;

transmitting means for transmitting said formed request signal to said music piece distributing apparatus;

receiving means for receiving the music piece data distributed from said music piece distributing apparatus; and decoding means for decoding the received music piece data by a compression decoding system corresponding to the compressing system designated by said compressing system identification information.

3. A music piece distributing method of distributing music piece data on the basis of a request from a remote receiver, comprising the steps of:

receiving a request signal from said receiver including at least music piece identification information and compressing system identification information; and transmitting music piece data in which a music piece corresponding to the music piece identification information included in said received request signal has been compressed by a compressing system corresponding to the compressing system identification information included in the request signal.

4. A music piece receiving method of requesting music piece data of a music piece selected by the user to a remote music piece distributing apparatus and receiving and outputting the music piece data distributed from the music piece distributing apparatus, comprising the steps of:

forming a request signal including at least music piece identification information to identify said selected music piece and compressing system identification information to identify a compressing system when the music piece is distributed;

transmitting said formed request signal to said music piece distributing apparatus;

receiving the music piece data distributed from said music piece distributing apparatus; and decoding the received music piece data by a compression decoding system corresponding to the compressing system designated by said compressing system identification information.

5. A music piece distributing system in which a music piece distributing apparatus distributes music piece data on the basis of a request from a remote receiver, wherein in said receiver, a request signal including at least music piece identification information to identify said selected music piece and compressing system identification information to identify a compressing system when the music piece is distributed is formed and said formed request signal is transmitted to said music piece distributing apparatus, and in said music piece distributing apparatus, the transmitted request signal is received from said receiver, and the music piece data in which the music piece corresponding to the music piece identification information included in said received request signal has been compressed by the compressing system corresponding to the compressing system identification information included in the request signal is transmitted.

6. A music piece distributing apparatus according to claim 1, wherein receiver identification information to identify the receiver is further included in said request signal, and said music piece data is distributed to the receiver corresponding to said receiver identification information.

7. A music piece distributing apparatus according to claim 1, characterized in that said apparatus comprises: first storing means for storing music piece data which has previously been compressed by a plurality of compressing systems by an amount of only a plurality of music pieces; and first extracting means for extracting the music piece identification information included in said received request signal and the music piece data corresponding to the compressing system identification information from said first storing means, and said transmitting means transmits the music piece data extracted by said first extracting means.

8. A music piece distributing apparatus according to claim 1, characterized in that said apparatus comprises:

second storing means for storing a plurality of music piece signals;

second extracting means for extracting the music piece signal corresponding to the music piece identification information included in said received request signal from said second storing means; and compressing means for compressing said extracted music piece signal by the compressing system corresponding to the compressing system identification information included in said received request signal, and said transmitting means transmits the music piece data compressed by said compressing means.

9. A music piece distributing apparatus according to claim 1, characterized in that said apparatus comprises:

third storing means for storing additional information of music pieces by an amount of a plurality of music pieces; and third extracting means for extracting the additional information of the music piece corresponding to the music piece identification information included in said received request signal from said third storing means, and said transmitting means transmits the extracted additional information together with the music piece data.

10. A music piece distributing apparatus according to claim 1, characterized in that said apparatus comprises:

fourth storing means for storing video information corresponding to music pieces by an amount of a plurality of music pieces; and fourth extracting means for extracting the video information of the music piece corresponding to the music piece identification information included in said received request signal from said fourth storing means, and said transmitting means transmits the extracted video information together with the music piece data.

11. A music piece distributing apparatus according to claim 10, characterized in that said video information is a signal compressed by a predetermined compressing system.

12. A music piece distributing apparatus according to claim 1, characterized in that said apparatus comprises:

first storing means for storing music piece data which has previously been compressed by a plurality of compressing systems by an amount of only a plurality of music pieces;

second storing means for storing a plurality of music piece signals;

first detecting means for detecting whether the music piece data corresponding to the music piece identification information and the compressing system identification information included in said received request signal has been stored in said first storing means or not;

fifth extracting means for extracting the requested music piece data from said first storing means in the case where the requested music piece data has been stored in the first storing means as a result of said detection;

sixth extracting means for extracting the requested music piece signal from said second storing means when the requested music piece data is not stored in said first storing means as a result of said detection; and compressing means for compressing the music piece signal extracted by said sixth extracting means by the compressing system corresponding to the compressing system identification information included in said received request signal, and said transmitting means transmits the music piece data which is outputted from said fifth extracting means or said compressing means.

13. A music piece receiving apparatus according to claim 2, wherein said forming means further forms a request signal including receiver identification information to identify a receiver, and said receiving means receives only a transmitted signal in the case where said signal has been transmitted to said receiver itself.

14. A music piece receiving apparatus according to claim 2, characterized by comprising fifth storing means for storing said received music piece data.

15. A music piece receiving apparatus according to claim 14, characterized in that said apparatus comprises:

second detecting means for detecting whether the music piece data of the music piece selected by the user has been stored in said fifth storing means or not; and seventh extracting means for extracting the selected music piece data from said fifth storing means in the case where the selected music piece data has been stored in said fifth storing means as a result of said detection, and in the case where the selected music piece data is not stored in said fifth storing means as a result of said detection, said request signal is formed by said forming means.

16. A music piece receiving apparatus according to claim 2, characterized in that said receiving means further receives additional information accompanied in the transmitted music piece data.

17. A music piece receiving apparatus according to claim 2, characterized in that said receiving means further receives video information corresponding to the transmitted music piece data.

18. A music piece receiving apparatus according to claim 14, characterized in that said fifth storing means stores additional information and video information transmitted together with the music piece data.

19. A music piece receiving apparatus according to claim 2, characterized in that said apparatus comprises:

decoding means constructed by a plurality of decoders corresponding to different compressing systems; and selecting means for selecting the decoder corresponding to the compressing system designated by said request signal from said plurality of decoders, and said distributed music piece data is supplied to the selected decoder.

* * * * *

UNITED STATES PATENT AND TRADEMARK OFFICE
CERTIFICATE OF CORRECTION

PATENT NO. : 6,271,455 B1
DATED : August 7, 2001
INVENTOR(S) : Masanori Ishigaki and Teruyuki Shitara It is certified that error appears in the above-identified patent and that said Letters Patent is hereby corrected as shown below:

Title page, Item [54], and Column 1, lines 1-5,
Title, "MUSIC PIECE DISTRIBUTING APPARATUS, MUSIC PIECE RECEIVING APPARATUS, MUSIC PIECE DISTRIBUTING METHOD, MUSIC PIECE RECEIVING METHOD, AND MUSIC PIECE DISTRIBUTING SYSTEM" should read -- SYSTEM AND METHOD FOR DISTRIBUTING AND RECEIVING MUSIC --.

Column 1,
Line 36, cancel the comma after "characteristics."
Line 44, cancel the word "also" after the word "there."

Column 2,
Line 26, insert the word -- also -- after the word "there."
Line 26, cancel the word "further" after the word "is."

Column 3,
Line 4, cancel the words "is applied" after the word "invention."
Line 8, cancel the word "applied" after the word "invention."
Line 17, cancel the words "to which" after the word "side."
Lines 21, 25, 26, 32 and 33, cancel the words "is applied" after the word "invention."

Column 4,
Line 3, "received" should read -- receive --.

Column 7,
Line 22, "hereinlater" should read -- hereinafter --.

UNITED STATES PATENT AND TRADEMARK OFFICE

CERTIFICATE OF CORRECTION

PATENT NO. : 6,271,455 B1
DATED : August 7, 2001
INVENTOR(S) : Masanori Ishigaki and Teruyuki Shitara It is certified that error appears in the above-identified patent and that said Letters Patent is hereby corrected as shown below:

Column 12,
Line 60, "discrimination" should read -- determination --.

Signed and Sealed this

Twenty-third Day of April, 2002

Attest:

JAMES E. ROGAN

*Attesting Officer* *Director of the United States Patent and Trademark Office*